3,462,383
WET STRENGTH ADDITIVES FOR CELLULOSIC PRODUCTS

Juan Longoria III, and Greene W. Strother, Jr., Lake Jackson, Tex., assignors to The Dow Chemical Company, Midland, Mich., a corporation of Delaware
No Drawing. Filed Mar. 7, 1966, Ser. No. 532,069
Int. Cl. C08g 30/14
U.S. Cl. 260—9    10 Claims

ABSTRACT OF THE DISCLOSURE

This invention concerns new alkylenepolyamine resins useful as wet strength additives for paper and other fibrous cellulosic products. More specifically these water-soluble cationic resins are prepared from an alkylenepolyamine, a diglycidyl ether and epichlorohydrin.

BACKGROUND

The demand for fibrous cellulosic products with improved wet strength has spurred development of new additives and technology. In U.S. Patent 2,595,935 Daniel and Landes describe an alkylenepolyamineepichlorohydrin resin useful as a wet strength additive. The use of an alkylated fatty acid polyamide is disclosed by Latham and Morton in U.S. Patent 2,686,121. Keim describes in U.S. Patent 2,926,116 a cationic resin prepared from epichlorohydrin and a $C_3$–$C_{10}$ dicarboxylic acid polyamide.

It has now been discovered that new and improved wet strength additives can be obtained by a process which comprises: (A) reacting a diglycidyl ether of Formula I or II:

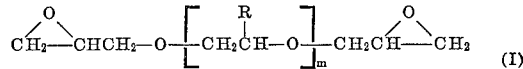

wherein each R is individually H, $CH_3$ or $C_2H_5$, and $m$ is 0–6; or

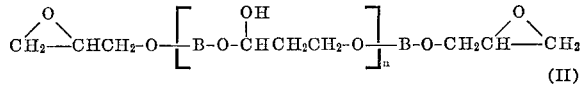

wherein each B is individually a $C_{12}$–$C_{18}$ aromatic group of a bisphenol, and $n$ is 0–2, with an alkylenepolyamine of Formula III:

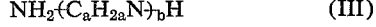

wherein $a$ is an integer from 2–4 and $b$ is an integer from 1–5, to obtain a water-soluble aminoether containing from 1.2–3.0 moles of alkylenepolyamine per mole of diglycidyl ether; and (B) condensing said aminoether with 0.4–1.5 moles of epichlorohydrin per amine hydrogen whereby a water-soluble resin is obtained.

Preferably the diglycidyl ether is reacted with 3–10 moles of the alkylenepolyamine to minimize crosslinking during formation of the intermediate amino ether and thereafter the excess alkylenepolyamine is removed by distillation to give a water-soluble product with terminal alkylenepolyamine groups. Then the desired wet-strength additive is prepared by condensing the aminoether with epichlorohydrin. The resulting water-soluble alkylenepolyamine-diglycidyl etherepichlorohydrin resins are effective and substantive wet-strength additives which can be used under acidic, neutral or alkaline conditions. Further they have an improved shelf life retaining water-solubility and activity under conditions where other wet-strength resins often gel.

An essential element in this invention is the aliphatic (I) or aromatic (II) diglycidyl ether. Preferred aliphatic epoxyethers are diglycidyl ether and the diglycidyl derivatives of $C_2$–$C_4$ alkylene glycols and polyglycols with an epoxide equivalent weight up to about 500. Particularly convenient are the conventional aliphatic diglycidyl ethers used as epoxy resin intermediates.

An aromatic diglycidyl ether obtained from a $C_{12}$–$C_{18}$ bisphenol and epichlorohydrin can also be used. Particularly suitable is a diglycidyl ether of Bis Phenol "A" (4,4' isopropylidene phenol) with an epoxide equivalent weight of about 170–500. However, the diglycidyl ethers of other $C_{12}$–$C_{18}$ bisphenols including 4,4' isopropylidene-di-o-cresol and 4,4'-diphenol can be used provided the epoxide equivalent is in the range from about 130–500.

Suitable alkylenepolyamines are compounds of Formula III:

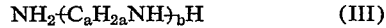

wherein $a$ is an integer from 2–4 and $b$ is 1–5.

Preferred are 1,2-alkylenediamines such as ethylenediamine, 1,2-propylenediamine, diethylenetriamine, dipropylenetriamine, triethylenetetraamine and pentaethylenehexamine. However, 1,3-diaminopropane and 1,4-diaminobutane can also be used.

By using initially at least 2.5 and preferably 3–10 moles of alkylenepolyamine per mole of diglycidyl ether, formation of an insoluble cross-linked resin is minimized. With care, in some cases a soluble intermediate resin can be prepared by mixing 1.2–2.0 moles of an alkylenepolyamine with 1.0 mole of a diglycidyl ether at about room temperature. Yet it is preferable to add the diglycidyl ether slowly to excess alkylenepolyamine over a period of several hours at 25–100° C. A temperature of 40–60° C. is often used. Also a diluent such as a $C_1$–$C_4$ alcohol, a $C_1$–$C_4$ chlorinated hydrocarbon, or a $C_6$–$C_{10}$ aromatic hydrocarbon is advantageous to increase solubility and moderate the reaction. When the reaction is complete, usually 10–15 minutes after addition of the diglycidyl ether at 40–60° C., the excess alkylenepolyamine and any diluent are stripped by distillation to obtain a stable, viscous, water-soluble aminoether. The soluble aminoether is predominately a linear adduct of the diglycidyl ether capped at each end with an alkylenepolyamine and contains an average of from 1.2–3.0 moles of alkylenepolyamine per mole of diglycidyl ether.

Reaction of the intermediate aminoether containing 1.2–3.0 moles of alkylenepolyamine per mole of diglycidyl ether with 0.4–1.5 moles of epichlorohydrin per equivalent of amine hydrogen yields the new alkylenepolyamine-diglycidyl ether-epichlorohydrin wet-strength additive. The amine hydrogen equivalent is calculated and used in the manner conventional in epoxy resin technology. Preferably a 25–50 percent aqueous solution of the aminoether is reacted with 0.4–1.5 moles of epichlorohydrin at 30–50° C. for 0.5–2.5 hours. Unreacted epichlorohydrin can be removed by distillation at reduced pressure or hydrolyzed in situ to give a viscous, amber colored product which is normally further diluted to a 10–30 weight percent aqueous solution. Its pH is normally between 5.0–7.5, but can be adjusted as required. The aqueous 30 percent product solution has a useful shelf life of at least 3-5 weeks although its viscosity gradually increases on standing.

Because of their cationic properties, these new resins are substantive to paper fibers and can be economically applied to the fibers in dilute aqueous suspension at the beater or headbox or other stage prior to forming the cellulose sheet. Alternately they can be applied to preformed paper stock by standard coating or impregnation techniques. The cationic properties of the resin not only improve its absorption by the cellulose pulp, but also improve the retention of fillers such as starch, clay, calcium carbonate and titanium dioxide normally used in the manufacture of paper.

Conveniently the cationic resin is employed as a 5-20 percent aqueous solution. About 0.1-2.0 weight percent based on dry pulp of the additive in the cellulosic product is adequate to give wet strength comparable to commercial polyamide or melamine resins. A substantial portion of the increased wet strength is obtained merely by normal drying of the treated cellulosic product. However, for optimum wet strength, further curing at 100-120° C. for a short time is desirable.

The choice of the optimum wet strength additive and conditions for use is easily determined by tests as shown in the following examples. Unless otherwise stated, all parts and percentages are by weight.

Example 1.—TETA-DGE I—Epichlorohydrin resin

To a solution of 300 parts (2.05 moles) of triethylenetetramine (TETA) in 200 parts of isopropanol heated at 90-95° C. was added over a period of 5 hours 219 parts (0.34 mole) of an aliphatic diglycidyl ether derived from polypropylene glycol and having an epoxy equivalent weight of about 320 and a viscosity of 55-100 cps. at 25° C. (D.E.R.®-732, a commercial epoxy resin from the Dow Chemical Company). The initial mole ratio of TETA/diglycidyl ether was 6.0. After complete addition the mixture was stirred at 90-100° C. for about 0.5 hour and distilled in vacuo to remove solvent and excess TETA. The viscous residue (342 parts) containing 4.44 equivalents of amine hydrogen and had an alkylenepolyamine-diglycidyl ether ratio of 2.5, e.g. 2.5 moles of TETA per mole of reacted diglycidyl ether.

This intermediate aminoether was dissolved in 400 parts of water and reacted with 400 parts (4.33 moles; 0.98 mole/equivalent of amine hydrogen) of epichlorohydrin for 1.5 hours at about 45° C. The amber color solution was concentrated in vacuo to remove excess epichlorohydrin and then sufficient water added to give an aqueous solution containing about 59 percent solids. The pH of the concentrated product solution, initially about 6.5, was adjusted to 5.0 with hydrochloric acid. This product had a shelf life of more than 3 weeks at room temperature without appreciable loss of wet-strength activity.

Example 2.—TETA-DGE II—Epichlorohydrin resin

A mixture of 38.0 parts (0.10 mole) of a commercial diglycidyl ether of Bis Phenol "A" having an epoxy equivalent weight of 189 and a viscosity of about 12,000 cps. at 25° C. (D.E.R.® 331 from The Dow Chemical Company) and 41.6 parts (0.29 mole) of TETA was heated with stirring at about 95° C. for 2.5 hours. The viscous product was diluted to a 25 percent solution with water.

To 100 parts of the 25 percent aqueous solution was added 33.3 parts (0.36 mole; 1.00 mole/amino hydrogen) of epichlorohydrin at 25-50° C. over a period of 0.25 hr. The mixture was then heated at 70° C. for an additional 0.75 hr. to obtain a homogeneous solution. Dilution with water gave a stable amber solution containing 16 percent total solids and having a pH of 7.5.

Example 3.—Other resins

Table 1 presents data on a number of other alkylenepolyamine-diglycidyl ether-epichlorohydrin resins prepared by the general processes described in Examples 1 and 2. In the table the initial reactant ratio is the mole ratio of alkylenepolyamine-diglycidyl ether as charged. The ratio for the intermediate aminoether is after reaction and stripping of excess alkylenepolyamine. The intermediate aminoethers were water-soluble materials with viscosities ranging from 3,000-100,000 cps. and higher depending on specific reactant ratios. In most cases the aminoethers were dissolved in water prior to reaction with epichlorohydrin. However several were reacted with epichlorohydrin without a diluent. Excess epichlorohydrin was removed by stripping at reduced pressure or by hydrolysis through heating the aqueous solution briefly at 75-100° C. Usually the yellow-amber product solutions were diluted further with water and used directly in the wet-strength test without isolation. The resins of Runs 6 and 7 which are outside the composition limits of this invention are included in Tables 1 and 2 to illustrate the criticality of the limitations.

TABLE 1.—ALKYLENEPOLYAMINE-DGE-EPICHLOROHYDRIN RESINS

| Resin No. | Amine[1] | DGE[2] | Reactant Ratio,[3] amine/DGE | Aminoether,[4] amine/DGE | Epichlorohydrin,[5] moles/NH |
|---|---|---|---|---|---|
| 1 | TETA | D.E.R. 732 | 6.0 | 2.5 | 0.98 |
| 2 | TETA | D.E.R. 331 | 2.8 | 2.8 | 1.00 |
| 3 | TETA | D.E.R. 732 | 4.0 | 2.0 | 0.40 |
| 4 | TETA | D.E.R. 736 | 6.0 | 2.4 | 1.07 |
| 5 | PEHA | D.E.R. 736 | 1.25 | 1.25 | 1.12 |
| 6 | TETA | D.E.R. 732 | 5.0 | 0.75 | 0.83 |
| 7 | TETA | D.E.R. 732 | 10.0 | 10.0 | 1.00 |

[1] TETA-triethylenetetramine; PEHA-pentaethylenehexamine
[2] Diglycidyl ether: D.E.R. 732—a commercial polyglycol diglycidyl ether with an epoxide equivalent weight of 305-335 and a viscosity of 55-100 cps. at 25° C. D.E.R. 736—a commercial polyglycol diglycidyl ether with an epoxide equivalent weight of 175-205 and a viscosity of 30-60 cps. at 25°C. D.E.R. 331—a commercial diglycidyl ether of bisphenol A with an epoxide equivalent weight of 170-180 and a viscosity of 3,000-6,500 cps. at 25°C.
[3] Moles alkylenepolyamine charged per mole diglycidyl ether.
[4] Moles alkylenepolyamine reacted per mole diglycidyl ether.
[5] Moles epichlorohydrin charged per amino hydrogen equivalent.

Example 4.—Wet strength tests

Unbleached kraft pulp was beaten to a Canadian Standard Freeness (TAPPI Method T227M-50) of 500 ml. in a Nobel and Wood beater. The pulp was diluted to 0.25 percent solids and the pH adjusted as required with either hydrochloric acid or caustic. The desired amount of additive was blended with the test pulp slurry for 1 minute and then sheets were formed on a British hand sheet machine (TAPPI Method T205M-1960). The test sheets were dried at 130° C. for 30 sec. and then curved for 1 hour at 105° C. After conditioning at room temperature, the test sheets were soaked in water for 2 hours before measuring the burst strength by TAPPI Method T403M-53.

(A) Typical wet burst strength data using the epichlorohydrinalkylenepolyamine-diglycidyl ether additives are given in Table 2. Note that Resin No. 6 and 7 prepared with reactant ratios outside the limits of the present invention has essentially the same wet strength effectiveness as an epichlorohydrin-triethylenetetramine product prepared without a diklycidyl ether. In contrast additives prepared with the indicated reactant ratios give improved wet strength comparable to an effective commercial polyamide additive.

TABLE 2.—WET STRENGTH TEST

| Pulp pH | pH 5.0 | | | | pH 7.0 | | | | pH 9.0 | | | |
|---|---|---|---|---|---|---|---|---|---|---|---|---|
| Percent added resin | 0.25 | 0.50 | 0.75 | 1.00 | 0.25 | 0.50 | 0.75 | 1.00 | 0.25 | 0.50 | 0.75 | 1.00 |
| Resin No.: | | | | | | | | | | | | |
| 1 | 14.0 | 16.5 | 22.0 | 23.0 | 13.7 | 18.0 | 23.3 | 23.0 | 14.7 | 20.1 | 23.0 | 25.5 |
| 2 | 12.5 | 18.0 | 21.0 | 26.5 | 10.5 | 16.7 | 21.7 | 24.0 | 9.3 | 17.0 | 18.3 | 23.3 |
| 3 | 13.3 | 16.7 | 19.5 | 19.8 | 13.0 | 16.9 | 18.8 | 19.7 | 11.4 | 16.5 | 18.2 | 19.4 |
| 4 | 11.5 | 14.7 | 19.0 | 20.0 | 11.5 | 15.0 | 15.5 | 18.7 | | | | |
| 5 | 12.3 | 17.7 | 22.4 | 21.3 | 11.4 | 15.2 | 19.3 | 22.1 | | | | |
| 6 | | | 10.0 | 10.5 | 8.7 | 6.3 | | | 7.7 | | 11.4 | 11.3 |
| 7 | 5.2 | 7.6 | 9.3 | 11.0 | 5.2 | 6.8 | 8.7 | 10.8 | | | | |
| TETA-Epi [2] | 6.0 | 7.4 | 10.4 | 10.6 | 4.5 | 7.2 | 8.3 | 9.5 | 4.7 | 6.5 | 6.8 | 8.5 |
| Kymene 559 [3] | 16.4 | 24.4 | 25.7 | 30.1 | 19.3 | 28.1 | 28.2 | 31.7 | | | | |

[1] Blank with untreated pulp, 3.0 p.s.i. at pH 7.0
[2] Condensation product of thriethylenetetramine and 2.1 moles of epichlorohydrin.
[3] Kymene 557, a commercial fatty acid polyamide resin from Hercules Powder Co.

(B) Although curing at 100–120° C. after forming the paper sheet is desirable for optimum increase in wet strength, the present additive also provides a significant increase in wet burst strength merely on conventional drying of the formed paper sheet without a further cure. For example with Resin No. 2, 55–60 percent of the wet burst strength shown in Table 2 is obtained during initial drying of test sheet at 130° C. for 30 sec. This early development of effective wet strength is of considerable value in paper processing.

(C) The epichlorohydrin-alkylenepolyamine-diglycidyl ether resins prepared as described in Examples 1 and 2 have a shelf life of more than 3–5 weeks as a 30 percent aqueous solution. Typical data from an accelerated stability test with a 30 percent aqueous solution of Resin No. 1 at 70° C. is given in Table III. Although the wet strength activity did decrease slowly, gelation did not occur and the product still had significant wet strength activity after 6 days.

TABLE 3.—ACCELERATED SHELF LIFE TEST
[Resin No. 1, 3% aqueous solution, 70° C.]

| Pulp pH | pH 5.0 | | | | pH 7.0 | | | |
|---|---|---|---|---|---|---|---|---|
| Percent added resin | 0.25 | 0.50 | 0.75 | 1.00 | 0.25 | 0.50 | 0.75 | 1.00 |
| Days at 70° C.: | | | | | | | | |
| 0 | 14.0 | 16.5 | 22.0 | 23.0 | 13.7 | 18.0 | 23.3 | 23.0 |
| 1 | 10.3 | 13.4 | 15.5 | 16.0 | 8.0 | 12.5 | 14.9 | 16.5 |
| 3 | 8.8 | 13.1 | 14.4 | 16.4 | 8.5 | 12.3 | 13.1 | 15.5 |
| 6 | 4.5 | 8.3 | 10.1 | 9.7 | 5.5 | 8.0 | 9.4 | 10.4 |

We claim:

1. A water-soluble polyamine resin useful as a wet-strength additive for cellulosic products obtained by a process which comprises:

(A) Adding a diglycidyl ether of Formula I or II:

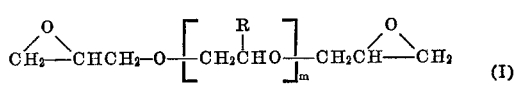

(I)

wherein each R is individually H, $CH_3$, or $C_2H_5$ and $m$ is 0–6; or

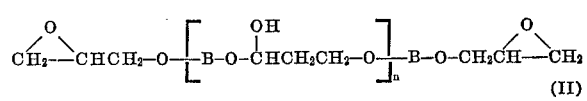

(II)

wherein each B is individually a $C_{12}$–$C_{18}$ aromatic group of a bisphenol, and $n$ is 0–2, slowly to an alkylenepolyamine of Formula III:

$$NH_2\text{-}(C_aH_{2a}N)_b\text{-}H$$ (III)

wherein $a$ is an integer from 2–4, and $b$ is an integer from 1–5, at a temperature of between about 25°–100° C. over a period of several hours and wherein the ratio of reactants is 1.2 to 10 moles of alkylene polyamine per mole of diglycidyl ether to obtain a water-soluble aminoether containing from 1.2–3.0 moles of alkylenepolyamine per mole of digylcidyl ether; and (B) Condensing said aminoether with 0.4–1.5 moles of epichlorohydrin per amine hydrogen by adding 0.4 to 1.5 moles of epichlorohydrin per equivalent of amine hydrogen to said aminoether at a temperature of 30° to 50° C. for about 0.5 to 2.5 hours whereby a water-soluble resin is obtained.

2. The water-soluble polyamine resin of claim 1 wherein the diglycidyl ether is a diglycidyl ether of a polyglycol and has an epoxide equivalent weight of 305–335.

3. The water-soluble polyamine resin of claim 1 wherein the diglycidyl ether is a diglycidyl ether of a polyglycol and has an epoxide equivalent weight of 175–205.

4. The water-soluble polyamine of claim 1 wherein the diglycidyl ether is a diglycidyl ether of (4,4' isopropylidene phenol) and has an epoxide equivalent weight of 170–180.

5. The water-soluble polyamine of claim 1 wherein the alkylenepolyamine is a 1,2-alkylenepolyamine.

6. The water-soluble polyamine of claim 5 wherein the 1,2-alkylenepolyamine is triethylenetetramine.

7. The water-soluble polyamine of claim 5 wherein the 1,2-alkylenepolyamine is pentaethylenehexamine.

8. A cellulosic product containing from 0.1–2.0 weight percent on dry cellulose of a water-soluble polyamine resin of claim 1.

9. The cellulosic product of claim 8 wherein the polyamine resin is prepared from a polyglycol diglycidyl ether having an epoxide equivalent weight of 305–335 and triethylenetetramine.

10. The cellulosic product of claim 8 wherein the polyamine resin is prepared from a (4,4' isopropylidene phenol) diglycidyl ether having an epoxide equivalent weight of 170–180 and triethylenetetramine.

References Cited

UNITED STATES PATENTS 2,500,600  3/1950  Bradley _____ 260—47
2,595,935  5/1952  Daniel et al.

(Other references on following page)

| | | | | | |
|---|---|---|---|---|---|
| 2,686,121 | 8/1954 | Lantham. | | 3,350,325 | 10/1967 Ashby et al. |
| 2,849,411 | 8/1958 | Lehmann et al. | | | |
| 2,898,309 | 8/1959 | Greer. | | | |
| 2,926,116 | 2/1960 | Keim. | | | |
| 2,926,154 | 2/1960 | Keim | 260—9 | | |
| 3,129,133 | 4/1964 | Doyle et al. | 162—164 | | |
| 3,215,654 | 11/1965 | Schmaltz. | | | |
| 3,240,721 | 3/1966 | Fordyce | 162—164 | | |

WILLIAM H. SHORT, Primary Examiner

E. M. WOODBERRY, Assistant Examiner

U.S. Cl. X.R.

162—164; 260—47, 2